Patented Jan. 9, 1951

2,537,691

UNITED STATES PATENT OFFICE 2,537,691

FUNGICIDAL TREATMENT

David T. Mowry and Richard R. Morner, Dayton, Ohio, assignors to Monsanto Chemical Company, St. Louis, Mo., a corporation of Delaware No Drawing. Application August 20, 1949, Serial No. 111,576

13 Claims. (Cl. 99—156)

This invention relates to methods of treating fruit to prevent or inhibit the growth of destructive fungi. More particularly the invention relates to treatment of citrus fruit for the purpose of preventing the development of the fungus which causes "stem-end rot."

Citrus fruit is subject to attack by the fungi, *Phomopsis citri* and *Diplodia natalensis*, which produce the effect known to the citrus fruit industry as "stem-end rot." Other objectionable fungi are also common, for example the blue and green penicillia molds. These organisms cause extensive destruction to citrus fruit during storage and shipping. Attempts have been made to treat the fruit with fungicidal compounds to prevent loss of fruit, but many such compounds are dangerous to use because of injury to the fruit by chemical action. It is known to the art that ethyl carbanilate is effective in destroying the objectionable fungi. This method is not entirely acceptable because of extensive damage to the fruit through chemical scalding of the rind.

In copending application Serial No. 111,575, filed August 20, 1949, by David T. Mowry and Norman R. Piesbergen, there is described and claimed a method of controlling the development of these fungi on citrus fruit by contacting the fruit with solutions of allyl carbanilate.

The primary purpose of this invention is to provide improved methods of treating fruit to prevent loss by action of fungus. A further purpose of the invention is to provide a fungicidal method which does not injure the fruit chemically. Further purposes of the invention will be apparent from the following disclosure.

It has been found that the higher molecular weight alkyl carbanilates and various alkoxyalkyl carbanilates are more useful than the lower molecular weight esters, and particularly the ethyl carbanilate known to the prior art. The very high molecular weight esters, for example dodecyl carbanilate, are less effective. The carbanilates which are useful in the practice of this invention may be represented by the structural formula:

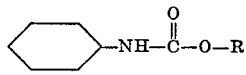

wherein R is an alkyl or an oxaalkyl radical having a chain of from three to eight carbon and oxygen atoms beginning with the carbon atom adjacent the ester linkage (CO—O—). Suitable esters for the practice of this invention are: n-propyl carbanilate, n-butyl carbanilate, the amyl carbanilates, 2-ethoxyethyl carbanilate, 2-(2'-methoxyethoxy)ethyl carbanilate, 2-methoxy-1-propyl carbanilate, 1-methoxy-2-propyl carbanilate, 2-methoxyethyl and other alkyl and oxaalkyl esters of carbanilic acid having aliphatic atom chains of from three to eight carbon and oxygen atoms beginning with carbon adjacent the ester linkage (CO—O—). Of particular utility are the alkyl or oxaalkyl carbanilates having from four to six carbon or oxygen atoms, for example n-butyl carbanilate, 2-methoxyethyl carbanilate, 1-methoxy-2-propyl carbanilate and the various amyl carbanilates and the various hexyl carbanilates.

The esters of carbanilic acid are used to treat citrus fruit by dipping the fruit, spraying it or otherwise coating the surface with a solution of the ester. Since many of these compounds are not water soluble it has been found desirable to use ethyl alcohol solutions or mixtures of water and alcohol in which the particular compounds are soluble. The solutions may contain from 0.5 to ten percent of the carbanilic acid esters, but preferred practice involves the use of solutions having from one to five percent by weight. If desired the carbanilate esters may be applied to the citrus fruit simultaneously with the wax customarily used for coating the fruit. The esters are generally soluble in the waxes, but are usually suspended in the aqueous wax emulsions and in this form applied to the fruit.

Further details of the practice and effect of the invention are set forth with respect to the following examples.

Example 1

Oranges were treated with various esters of carbanilic acid esters to ascertain the effect of the esters on the growth of fungus. The various lots of oranges were treated with five percent, 2.5 percent and 1.25 percent solutions of the different compounds and were stored for three weeks at 70° F. Each series of preparations were accompanied by a control experiment in which the oranges were dipped in alcohol solutions containing no carbanilic acid esters. The following table sets forth the observed data with respect to a wide variety of carbanilic acid esters and designates the percentage of usable oranges remaining at the end of the test period. Under each value there is a short description of the extent of surface damage on the treated fruit.

| Ester of Carbanilic Acid | No. of Oranges | Control | 5% | 2.5% | 1.25% |
|---|---|---|---|---|---|
| Methyl | 75 | 31 | 80 Slight | 76 Slight | 49 None |
| Ethyl | 75 | 28 | 83 Moderate | 75 Moderate | 36 None |
| Isopropyl | 50 | 40 | 78 Moderate | 64 Slight | 42 None |
| n-Propyl | 75 | 28 | 89 Slight | 88 Slight | 56 Slight |
| n-Butyl | 25 | 40 | 84 None | 76 None | 84 None |
| n-Dodecyl | 25 | 40 | 52 None | 56 None | 60 None |

*Example 2*

Using the procedure described in the preceding example various alkoxy alkyl esters of carbanilic acid were used to treat oranges. The following table demonstrates the observed data.

| Ester of Carbanilic Acid | Percent Sound Oranges | | | | Surface Damage |
|---|---|---|---|---|---|
| | Control | 2.5% | Surface Damage | 1.25% | |
| 2-Methoxyethyl | 30 | 94 | Slight | 90 | None. |
| 2-Ethoxyethyl | 32 | 84 | do | 72 | Do. |
| 2-(2'-Methoxyethoxy)-ethyl | 44 | 88 | do | 90 | Do. |
| 2-Methoxy-1-propyl | 36 | 84 | do | 92 | Do. |
| 1-Methoxy-2-propyl | 24 | 92 | do | 76 | Do. |
| Methyl | 31 | 76 | do | 49 | Do. |
| Ethyl | 28 | 75 | do | 36 | Do. |

The invention is defined by the following claims.

We claim:

1. A method of retarding fungus growth on citrus fruit, which comprises contacting the fruit with an ester of the group consisting of alkyl carbanilates and oxaalkyl carbanilates, wherein the alkyl and oxaalkyl radicals have an atom chain of from three to eight carbon and oxygen atoms beginning with the carbon atom adjacent the ester linkage.

2. A method of retarding fungus growth on citrus fruit, which comprises contacting the fruit with from 0.5 to ten percent by weight of an ester of the group consisting of alkyl carbanilates and oxaalkyl carbanilates wherein the alkyl and oxaalkyl radicals have an atom chain of from three to eight carbon and oxygen atoms beginning with the carbon atom adjacent the ester linkage.

3. A method of retarding fungus growth on citrus fruit, which comprises contacting the fruit with an alkyl carbanilate wherein the alkyl radical has from four to six carbon atoms in a continuous straight chain beginning with the carbon atom adjacent the ester linkage.

4. A method of retarding the fungus growth on citrus fruit, which comprises contacting the fruit with an aqueous wax emulsion containing from 0.5 to ten percent by weight of an alkyl carbanilate wherein the alkyl radical has from four to six carbon atoms in a continuous straight chain beginning with the carbon atom adjacent the ester linkage.

5. A method of retarding the fungus growth on citrus fruit, which comprises contacting the fruit with an aqueous wax emulsion of an amyl carbanilate.

6. A method of retarding the fungus growth on citrus fruit, which comprises contacting the fruit with an aqueous wax emulsion containing from 0.5 to ten percent by weight of an amyl carbanilate.

7. A method of retarding the fungus growth on citrus fruit, which comprises contacting the fruit with an aqueous wax emulsion of n-butyl carbanilate.

8. A method of retarding the fungus growth on citrus fruit, which comprises contacting the fruit with an aqueous wax emulsion containing from 0.5 to ten percent by weight of n-butyl carbanilate.

9. A method of retarding the fungus growth on citrus fruit, which comprises contacting the fruit with an ethyl alcohol solution of an amyl carbanilate.

10. A method of retarding the fungus growth on citrus fruit, which comprises contacting the fruit with an ethyl alcohol solution of n-butyl carbanilate.

11. A method of retarding the fungus growth on citrus fruit, which comprises contacting the fruit with an aqueous wax emulsion of methoxyethyl carbanilate.

12. A method of retarding the fungus growth on citrus fruit, which comprises contacting the fruit with an aqueous wax emulsion containing from 0.5 to ten percent by weight of methoxyethyl carbanilate.

13. A method of retarding the fungus growth on citrus fruit, which comprises contacting the fruit with an ethyl alcohol solution of methoxyethyl carbanilate.

DAVID T. MOWRY.
RICHARD R. MORNER.

No references cited.